United States Patent [19]

Cole

[11] Patent Number: 5,160,079
[45] Date of Patent: Nov. 3, 1992

[54] APPARATAS AND METHOD FOR LIFTING AND TRANSPORTING PALLETIZED WORKPIECES

[75] Inventor: Ronald D. Cole, Danville, Ill.

[73] Assignee: Automation International, Inc., Danville, Ill.

[21] Appl. No.: 747,935

[22] Filed: Aug. 21, 1991

[51] Int. Cl.⁵ .............................................. B23K 37/04
[52] U.S. Cl. ..................................... 228/212; 29/430; 29/563; 29/33 P; 29/795; 228/47
[58] Field of Search .................... 228/47 R, 47 A, 212; 29/430, 792, 799, 784, 783, 785, 787, 563, 33 P; 198/346.1, 346.3, 468.6, 478.1; 269/57, 81

[56] References Cited

U.S. PATENT DOCUMENTS

| | | | |
|---|---|---|---|
| 3,570,834 | 3/1971 | Hoglund | 269/81 X |
| 4,049,500 | 9/1977 | Kamm | 198/346.1 |
| 4,390,172 | 6/1983 | Gotman | 29/563 X |
| 4,547,955 | 10/1985 | Shiomi et al. | 29/33 P X |
| 4,611,749 | 9/1986 | Kawano | 228/47 A X |
| 5,044,541 | 9/1991 | Sekine et al. | 29/783 X |

Primary Examiner—Kenneth J. Ramsey
Attorney, Agent, or Firm—William Weigl

[57] ABSTRACT

Palletized, unassembled workpieces are transported by a carousel to successive work stations at which pallets are deposited on work tables. The tables and each of the pallets are provided with registering mechanism so that the workpieces are identically located in each station. Robotic welding or other tasks requiring a high degree of repetitive accuracy can be performed at each station to fabricate the workpieces into finished or semi-finished end products. Both the depositing of pallets on and lifting them from the work tables can be accomplished at a creep speed.

15 Claims, 4 Drawing Sheets

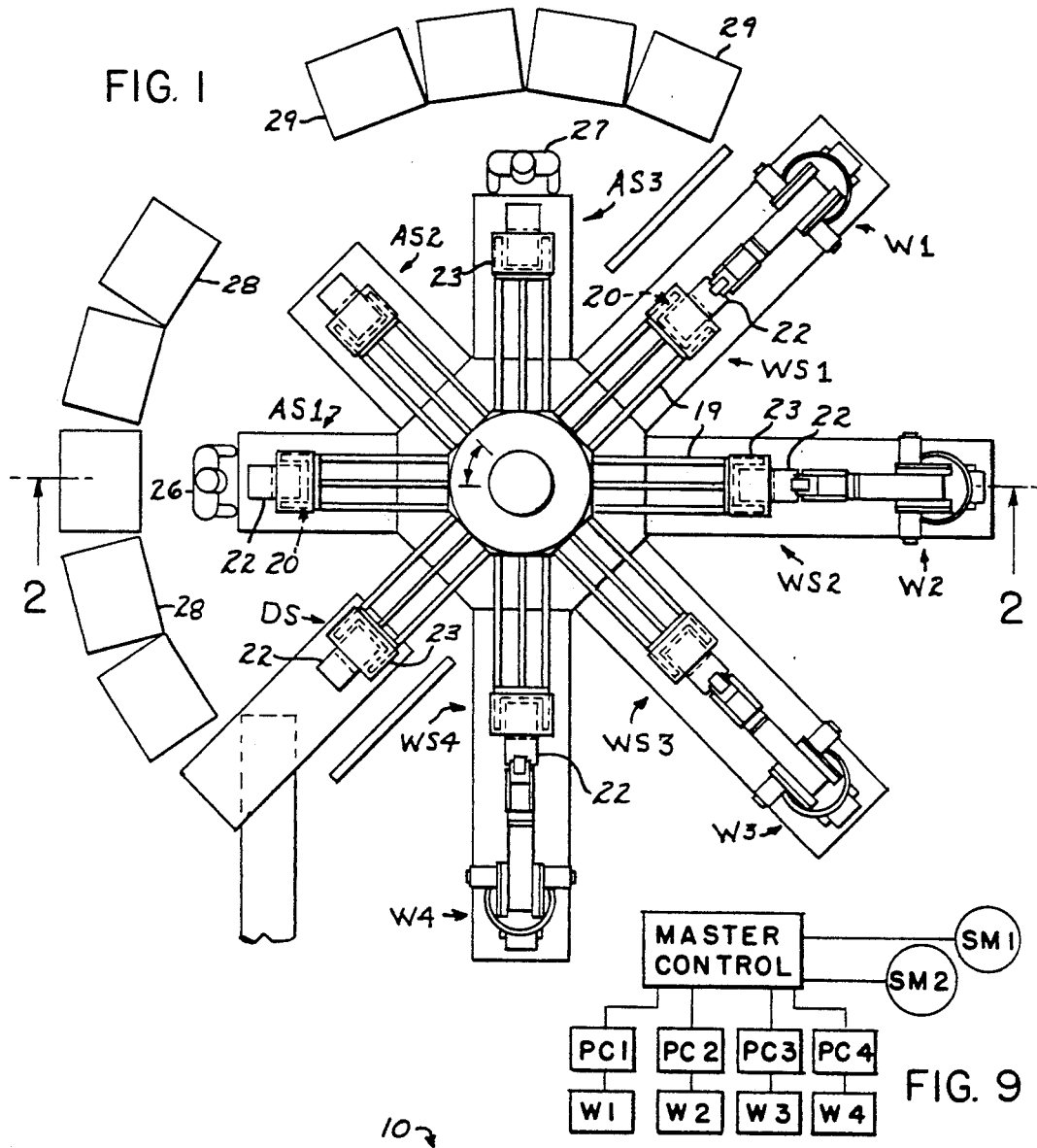
FIG. 1
FIG. 9
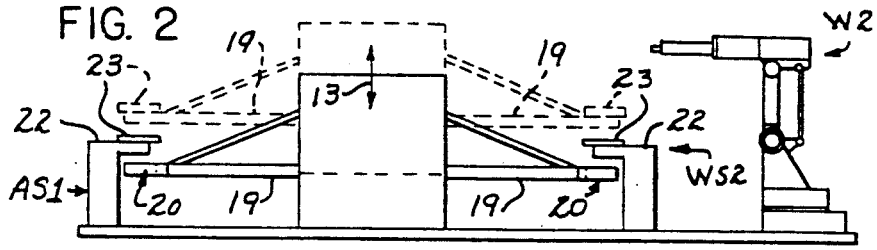
FIG. 2

APPARATAS AND METHOD FOR LIFTING AND TRANSPORTING PALLETIZED WORKPIECES

This invention relates generally to a system for transporting fixed-position unassembled workpieces carried on pallets through successive work stations and automatically fabricating the workpieces into end or intermediate products. In particular, this invention relates to a transporter which is capable of improved productivity over systems known heretofore, and has a simpler and less-expensive drive for moving the workpieces through their successive work stations while registering the pallets with their workpieces accurately at each station, the registration being independent of the drive mechanism used in transporting the pallets.

BACKGROUND OF THE INVENTION

Automatic repetitive fabrication of workpieces such as by arc or spot welding has been achieved in a variety of ways. In one known instance, a turntable rotating either on a horizontal or vertical axis has a pair of fixtures positioned 180 degrees apart, and both are positioned accurately on the turntable. A worker places unassembled parts or workpieces in one of the fixtures and indexes the system 180 degrees to the work station at which automatic welding may be performed. Servo motors are used for operating the turntable, with precision control means being required to stop the motors to place the workpieces in accurate relation to the welder. While welding is taking place, the worker places a second set of unassembled workpieces on the turntable diametrically opposite the welder. Upon completion of welding the first set and mounting the second set on the turntable, the worker again indexes the equipment 180 degrees to enable removal of the fabricated set and to locate the second set in position to be welded. While such systems perform reasonably efficiently, they are limited in productivity, especially if the product to be fabricated requires complex welding operations or has a large number of pieces. This is due to the fact that the work station ordinarily allows only one person to operate from that position. It further requires that the single person do both tasks of placing workpieces in position and removing finished product from the machine. Additionally, not only must driving be done with precision in relation to the welder, but the entire mechanism must be held to close tolerances, i.e., with minimum "play" of the shafts and bearings in order to place every set of workpieces in the same position each time with respect to an automated, programmed welder.

In another system designed for the same general purpose, a pair of arms have vertical axes spaced apart horizontally, and both are driven in the same horizontal plane. A worker assembles workpieces on a pallet, locates the pallet on a first one of said arms in registration with clamping means thereon, and a servo motor drives the first arm to carry the workpieces through one or more work stations spaced along a peripheral path of travel of the end of the arm. The servo motor stops the arm at each station so that welding can take place at each location. After perhaps 270 degrees of travel, the arm deposits the pallet and partially fabricated product on a fixed-position transfer table and rotates on to its original position to pick up another pallet with unassembled workpieces. The transfer table is motor-driven on a vertical axis. It functions to rotate the pallet 180 degrees in the same horizontal plane for pick up by the second arm in the same relation that the pallet originally had with the first arm. The second arm receives the pallet from the transfer table, and, like the first arm, carries it through one or more work stations positioned along the periphery of the second arm's travel. Upon completion of fabrication, the pallet is transferred to a delivery station either for manual removal or automatic release as was done at the transfer table. The fabricated product may then be removed from the pallet and the pallet reused at the infeed station. This system, while effective, has productivity limitations, requires use of accurately-controlled servo motors and, especially if the welders are robotically controlled arc welders, necessitates that the two arms, the transfer table and the motors for all three be accurately mounted and maintained in relation with one another.

SUMMARY OF THE INVENTION

This invention relates to a novel rotating carousel having a pair of servo motors which drive the carousel both vertically and horizontally to move palletized workpieces through successive work stations located angularly with respect to the vertical axis of the carousel. All of the pallets are provided with a registering means which cooperates with mating registering means on a work table at each work station so that arms of the carousel will lift a pallet, transfer it over a table at the next work station, descend to cause the pallet to be registered precisely to the next table, move to a position below the table and then reverse direction to return below the table from which the pallet had been removed. Thereafter, upon completion of welding tasks at all of the work stations, the arms will lift the pallet immediately above it, raise it to a plane above the work tables, and move that second pallet over the next-following work station for deposit on its table. Depending upon the type of product being fabricated, one or more workers can be utilized to place unassembled workpieces on the pallets, and removal of fabricated products from the pallets can be accomplished by still another worker. Or, several workers can be working on the same job, each placing one or multiple workpieces on each pallet.

The apparatus and method allow for great flexibility in handling products which can be very simple or complex in nature, improves productivity by providing a continuous stream of products, and achieves all of this with a servo drive mechanism which requires neither the great degree of accuracy nor the precision such as the above-mentioned equipment, since the primary precision is achieved by the registering elements on the pallets and work tables rather than the transporting mechanism itself.

BRIEF DESCRIPTION OF THE DRAWINGS

FIG. 1 is a schematic plan view of a total system of the invention, including a carousel, pallet-transporting mechanism, stations for workers, fabrication work stations, and an outfeed mechanism.

FIG. 2 is a simplified schematic view taken substantially along lines 2—2 of FIG. 1, and illustrates vertical movement of a turret and arms of the carousel.

FIG. 9 is a simplified block diagram for controlling servo motors used to move the turret in its horizontal and vertical planes.

DESCRIPTION OF THE PREFERRED EMBODIMENT

Figure 6:
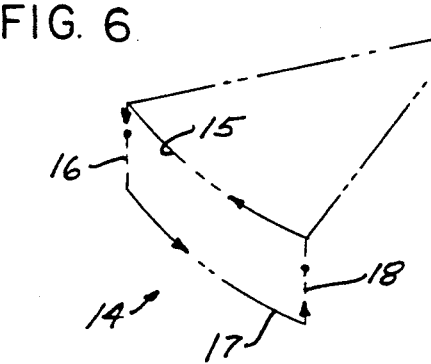
FIG. 6 is a schematic isometric view illustrating the preferred motion of the pallet-supporting arms.

Referring now to FIGS. 1 and 2, which show plan and elevational views respectively of the overall system, a carousel 10 is provided with a turret 11 which has bi-directional rotary motion shown by arrow 12 in FIG. 1 and vertical up and down motion as shown by arrow 13 in FIG. 2. Cross-referring to FIG. 6, the preferred embodiment shows a path of movement 14 including travel in a first, upper horizontal plane 15, descent along a line 16, return in a second, lower horizontal plane 17 and ascent along line 18. It is obvious, however, rather than have a path of movement such as 14, the carousel 10 may move through 360 degrees of unidirectional rotation with descent and ascent as pallets are placed in and removed from each work station. The work stations are identified as WS1-WS4 in FIG. 1. The number of such work stations provided is dependent upon the jobs to be performed. Additionally, while the length of the path of movement 14 corresponds to the angular spacing between work stations WS1 and WS2, the system can be designed to skip work station WS2 and travel from WS1 to WS3, depending on the job being performed, the set-up, the number of workers, etc.

Figure 7:
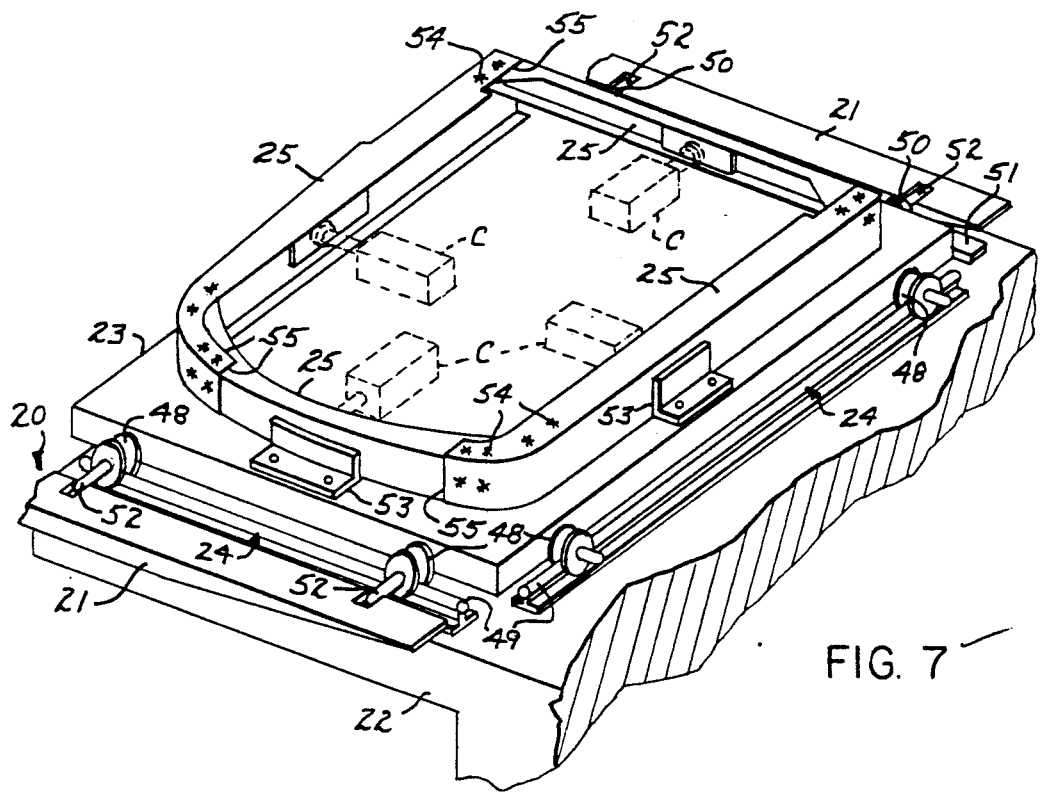
FIG. 7 is an isometric view of a fork just as it is about to deposit a pallet onto or lift it from a work table.

The turret 11 of FIG. 1 supports a plurality of radially-extending arms 19 at the distal end of each of which is a fork 20 having a pair of spaced apart tines 21, shown more clearly in FIG. 7. In the embodiment depicted in FIG. 1, there are eight arms 19 shown, one being located at each of assembly stations AS1-AS3, work stations WS1-WS4 and a delivery station DS. At the work stations are located robotically-controlled, programmable welders W1-W4. The welders may be either arc or spot welders, such, e.g., as shown in U.S. Pat. Nos. 4,931,617, 4,954,762 and 4,885,560. To the extent that information regarding operation and performance of either type of welder is desired for a more complete understanding of this invention, the descriptions in those patents are incorporated herein by reference.

At each of stations AS1-AS3, WS1-WS4 and DS, there is located a work table 22 for receipt of pallets 23 thereon. While not shown in detail in FIGS. 1 and 2, there is provided, particularly at stations WS1-WS4, a registering mechanism broadly designated 24 in FIG. 7. It can thus be seen from what has been described that pallets 23 are indexed in step-by-step fashion from one table to the next and the arms 19 are provided primarily for lifting the pallets from one station and transporting them to the next. The arms 19 and the turret 11 on which they are carried do not, therefore, require a great deal of precision either in the extent of angular rotation or raising and lowering of the turret to deposit pallets 23 on the registering mechanism 24 at each work station, and, as will be seen, only two servo motors SM1 and SM2 are provided for the horizontal and vertical movements of the turret 11 and its arms 19.

Clearly, in a mechanism and method according to this invention, it is necessary that welders W1 $\propto$ W4 be properly positioned in relation to tables 22, particularly to the registering mechanism 24 on the tables. It is also necessary that clamps C (FIG. 7) are precisely related to the positions of the registering mechanism 24 so that all of the workpieces which are clamped to the pallets 23 are also located in identical positions for identical fabrication. Although it is not essential to provide registering mechanism such as 24 at assembly stations AS-1-AS3 or delivery station DS, it is preferred to do so since all of the pallets will be similar, at least to the extent of the registering mechanism itself. It is feasible that several different fabrication jobs may be performed at the same time by different workers such as 26 and 27 (FIG. 1) and that the pallet construction for each job may be different. However, the registering mechanisms would preferably be the same, particularly where the turret travels only between one work station and the next and returns to the first. The parts in bins 28 and 29 can be the same or different, depending upon whether workers 26 and 27 are performing the same or different jobs.

Figure 3:
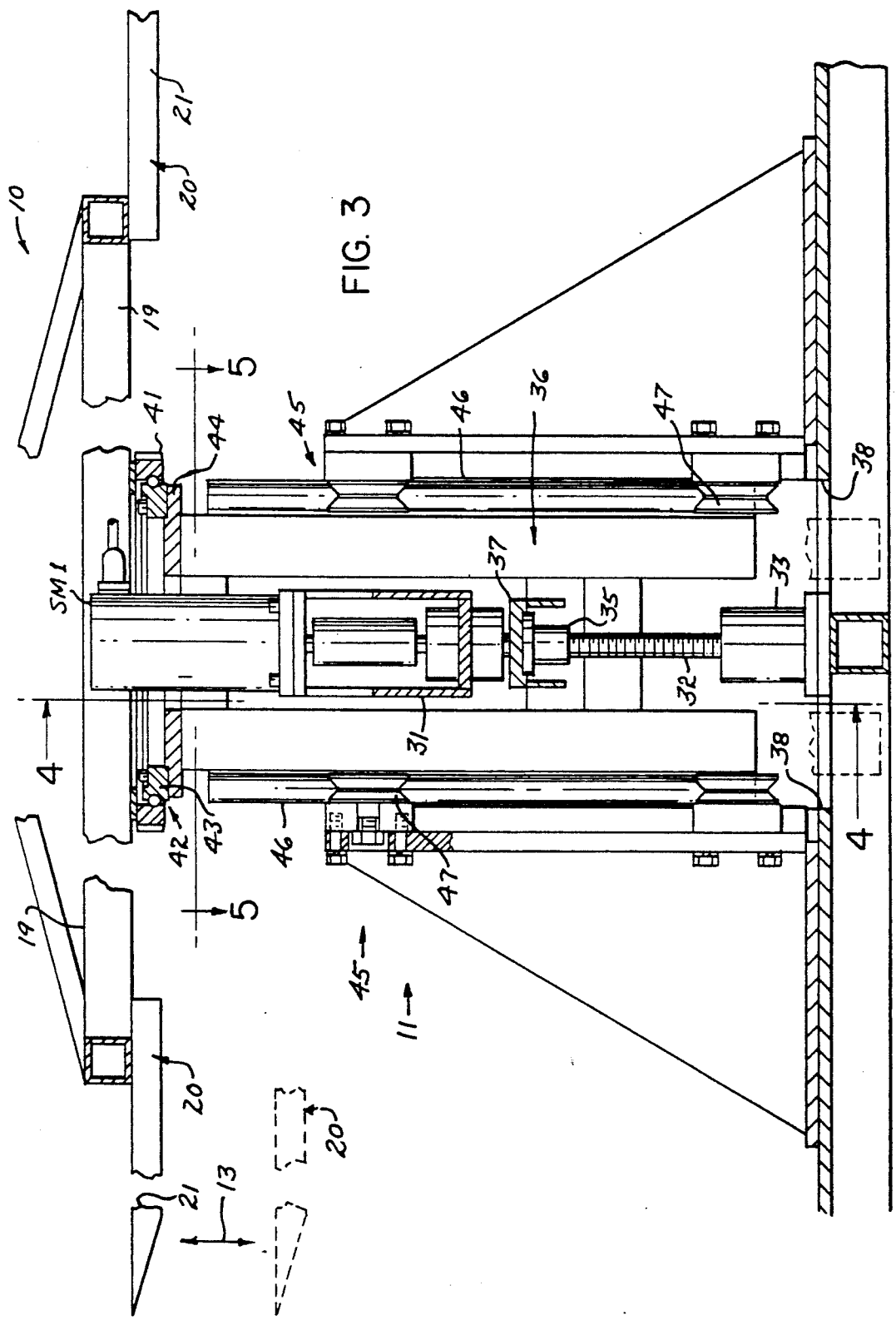
FIG. 3 is a vertical sectional view illustrating portions of the mechanism for raising and lowering the arms as well as rotating the arms in a horizontal plane.
Figure 4:
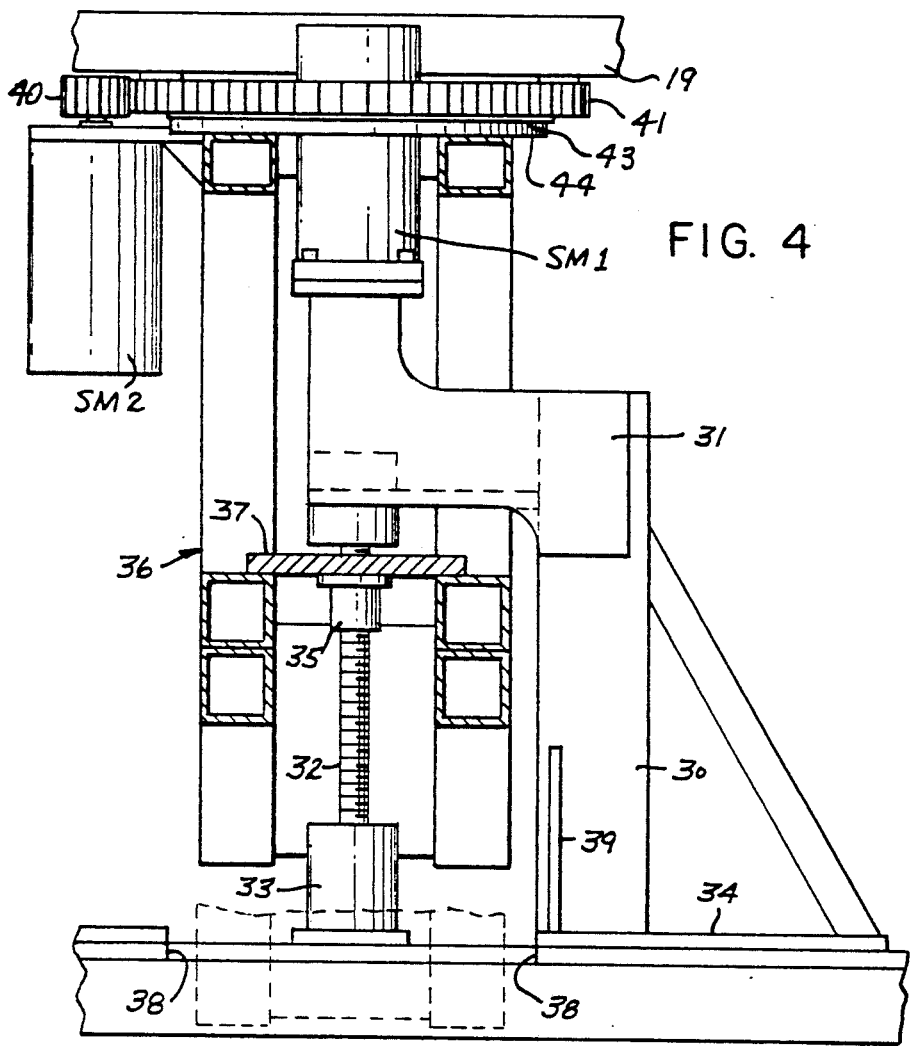
FIG. 4 is a vertical cross-sectional view taken substantially along lines 4—4 of FIG. 3.
Figure 5:
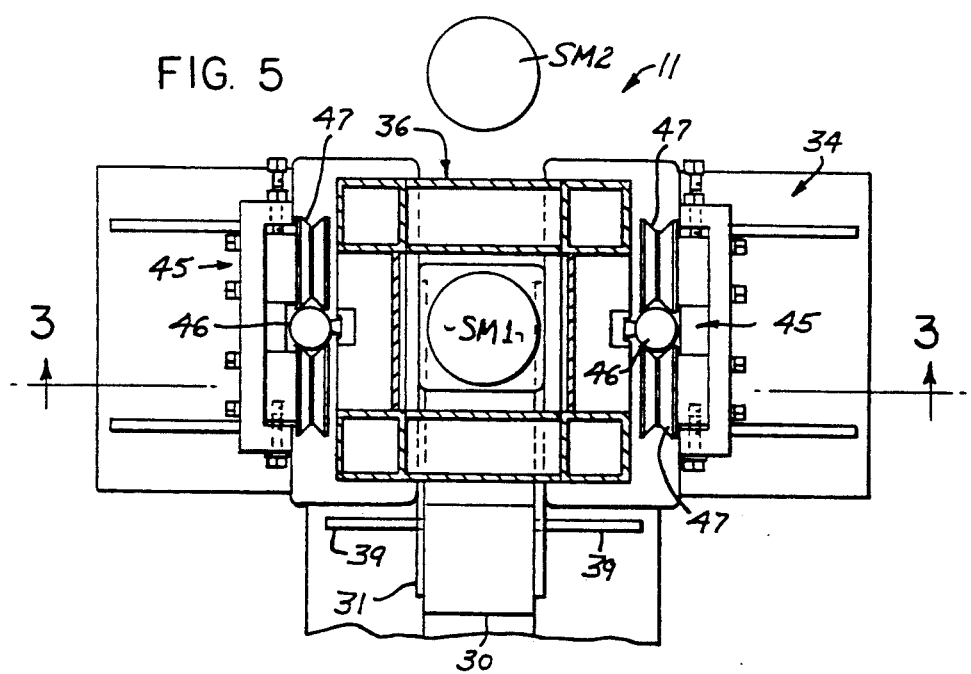
FIG. 5 is a cross-sectional plan view of the mechanism of FIG. 3 and is taken substantially along lines 5—5 thereof.

Cross-referring between FIGS. 3, 4 and 5, the turret is raised and lowered by servo motor SM1 and rotated on its vertical axis by servo motor SM2. Motor SM1 is fixed against rotation by being guided by an upstanding post 30. The post 30 is spanned by a cantilevered fork 31 to maintain the motor SM1 stationary relative to turret 11. Motor SM1 transmits rotary motion to a screw 32. Screw 32 is journaled in a bearing box 33 which is fixed to a base 34 for the carousel 10. Rotation of screw 32 by its motor causes a nut 35 to move up or down within limits permitted by the control switches (not shown) for the motor SM1. As shown in FIGS. 3 and 4, the nut 35 is near the upper end of its travel corresponding essentially to the first horizontal plane 15 in which the arms 19 transport the pallets in a forwarding direction. A tubular body structure 36 surrounds the motor SM1 and its screw and nut as shown best in FIG. 5, and provides the primary support for the arms 19 and forks 20. A plate 37 is part of the structure 36 and rests on the upper thrust-bearing surface of nut 35. Screw 32 passes freely through an enlarged opening in the plate 37.

Once the arms 19 have been forwarded to positions over the next work stations, the structure 36 will be driven downwardly by motor SM1 to the dotted-line position shown in FIG. 3. The lower end of the tubular body structure 36 can descend through openings 38 in the base 34 and the cantilevered fork 31 will move downwardly along the upstanding post 30 until it approaches plates 39 mounted on base 34. Limit switches stop servo motor SM1 before the nut 35 reaches its end positions. In addition, in the preferred form of the invention, in order to achieve maximum productivity, servo motor SM1 is driven rapidly as it descends until it is almost at the level at which pallets 23 are to be deposited on tables 22. The motor then shifts to a low or creep speed to gently set pallets down as the male and female elements of the registering mechanisms engage. After deposit, the turret 11 can be operated at any speed for the remaining descent, returned along the second, lower horizontal plane 17 and then raised along the line 18 to a point just below where the tines 21 of the forks 20 are in position to lift pallets on which work tasks have been completed. The speeds along line 16 and plane 17 are sufficient to avoid any delay, and are therefore job dependent. Subsequent lifting can be started at a slow speed, and, depending upon the type of registering mechanism 24 used and the height to which pallets 23 must be raised, the final lift can be either slow or rapid.

Movement of the carousel in horizontal plane 15 (FIG. 6) is accomplished by the servo motor SM2. That motor is suspended from the body structure 36 as shown in FIG. 4. Motor SM2 has a drive pinion 40 meshing with an annular driven ring gear 41. As shown best in FIG. 3, a ring gear 41 is the outer race of a bearing 42, with the inner bearing race 43 being fixed to a plate 44 non-rotatably carried by the structure 36. It will thus be seen that operation of servo motor SM2 will rotate the upper structure of the carousel defined by the arms 19 and forks 20 in the horizontal plane 15 relative to the body structure and the non-rotatable inner race 43. Servo motor SM2 is also controlled by limit switches (not shown) associated with the ends of travel of the turret 11 or arms 19 and is preferably multi-speed so that it starts smoothly, accelerates and decelerates to a relatively smooth stop.

Guide means 45 consisting of rods 46 and horizontally spaced sets of upper and lower V-grooved rollers 47 guide the structure 36 vertically during operation of servo motor SM1. The inner and outer races of the bearing 42 allow free turret rotation while receiving the weight of the arms 19, forks 20 and pallets 23 containing the workpieces. It can be seen that the vertical and horizontal motions are independent of each other and are provided by independent servo motors. In particular, with servo motor SM2 being mounted on body structure 36, it moves vertically only, but is capable of imparting rotary motion through any angle desired, including up to 360 degrees if that type of operation is chosen.

Referring now to FIG. 7, the pallet 23 has four guides 48 in spaced sets of two along each of the adjacent perpendicular edges of the pallet 23. The guides act as female members of the registering mechanism 24, which also includes a pair of circular rods 49 mounted on the upper surface of the table 22. Guides 48 are designed as V-grooved non-rotatable rollers. Their mountings may be provided with eccentric adjustments. Being circular, wear can be compensated for by presenting different points of the roller grooves for contact with the rods 49 when required. It is necessary to have all of the guides 48 in corresponding locations on all of the pallets 23 to the degree of precision required by the jobs to be performed. In addition, a pair of rollers 50 are fixedly located at the far side of the pallet in FIG. 7. Their outer peripheries may rest on a flat bar 51 to stabilize the pallet 23 as it rests on the table 22 if required. However, rods 49 and guides 48 ordinarily provide all of the support needed.

FIG. 7 also shows tines 21 of one of the forks 20. Each tine has a pair of upwardly-facing V-grooves for receiving axles 52 of the guides 48 at those sides of the pallet 23 parallel to the tines 21. The V-grooves extend from the inside edge of each tine 21 toward its outside edge to a depth which allows a small amount of space, so that the tines 21 constitute a coarse registering mechanism of the forks 20 to the axles 52 associated with rollers 50 and guides 48 adjacent tines 21. This provides a degree of horizontal "play" of the pallets 22 with respect to tines 21, but the tines 21 being V-grooved, the axles 52 will settle to the groove bottoms. The degree of play allowed by the grooves in tines 21 has to be within the limits to enable the guides 48 on each of the pallets 23 to settle properly on their respective rods 49 at each of the work stations. The guides 48 and rods 49 comprise a fine registering mechanism, whereas the axles 52 and the grooves in the tines 21 comprise a coarse registering mechanism.

Figure 8:
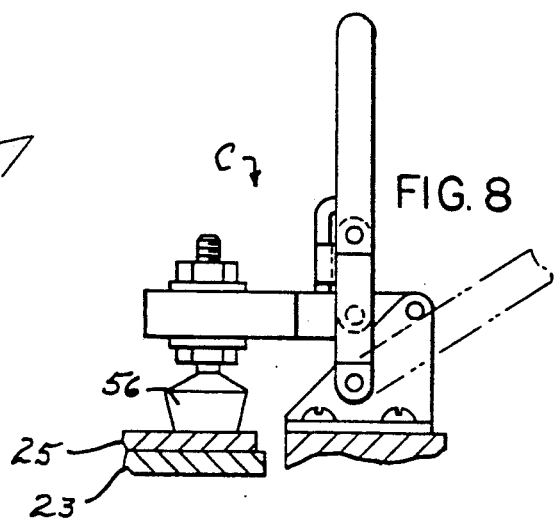
FIG. 8 illustrates one known type of clamp which may be utilized on the pallets for attaching unassembled workpieces thereto.

Shown in dotted lines in FIG. 7 are clamps C which press individual workpieces 25 against stops 53. Appropriate aligning marks or elements are provided on the pallets to assure precision location of the workpieces 25 on the pallets. Also depicted in FIG. 7 are a plurality of weld marks 54 which will ultimately be where spot welds are made to fabricate the parts 25 into a unitary structure. Obviously, if the welding to be performed is arc welding, beads will be created along edges such as 55. The clamps C may be of any conventional kind. An example of a standard toggle-actuated clamp is shown in FIG. 8, wherein a resilient foot 56 clamps a workpiece 25 downwardly against the upper surface of a pallet 23.

FIG. 9 illustrates a simplified block diagram of a master control for servo motors SM1 and SM2, and programmed controls PC1-PC4 for welders W1-W4, respectively. Since it is the controlled elements and not the controls that are of significance to this invention, it is believed unnecessary to illustrate and explain the details of the controls for a clear understanding of the invention, since such will be obvious to a person skilled in the control arts.

Having described my invention, I claim:

1. A transporter for conveying a pallet having multiple unconnected workpieces located in predetermined positions in relation to a registering means on said pallet between successive work stations at which the workpieces are fabricated by programmable welders into a unitary structure, a rotary carousel including a turret mounted for rotation on a fixed vertical axis, a plurality of pallet-transporting arms extending essentially horizontally and radially from said turret, said arms being equally angularly spaced and of the same length, and each arm having at its extended end a radially directed pallet-supporting fork having a pair of horizontally-spaced tines, a plurality of work tables extending peripherally around the carousel at a radial distance from said vertical axis corresponding to the length of said arms and said tables being spaced the same horizontal angular distance as said arms, whereby pallets supported on said forks can be carried thereby to said work tables and deposited thereon to enable welding of the workpieces, first motive means for imparting rotary motion to said turret to move said arms in a horizontal plane to convey pallets in succession from table to table, second motive means for imparting vertical motion to said turret for lowering and depositing pallets onto the tables or lifting them therefrom, clamp means on said pallets for affixing pieces to be fabricated thereto, registering means including upwardly-facing like first fine locating and registering members on each of said tables and cooperating downwardly-facing fine locating and registering members adjacent the undersides of each of said pallets, and upwardly-facing coarse third registering members on each of said fork tines and cooperating downwardly-facing coarse fourth registering members on each of said pallets, programmable automatic welding apparatus mounted in a predetermined relation with and adjacent each work table for performing fabrication tasks on workpieces placed on its table when a pallet is deposited on and registered thereto, and, control means for said first and second motive means, operable in response to completion of the fabrication tasks at all tables, to enable vertical lifting of pallets from each table, horizontal transporting of pallets to the next-following table and vertical lowering them thereonto, and further enabling work to commence at the next table only upon completion of depositing and locating the pallets on the tables.

2. A transporter according to claim 1 wherein each table is cantilever-supported outwardly of the radial reach of said forks to enable horizontal passage of said forks beneath the table after deposit of pallets onto successive tables, and wherein said first motive means indexes pallets from each station to the next during transporting and returns the arms horizontally rearwardly to their original positions after pallets have been deposited onto the tables, said rearward movement being accommodated by coplanar open spaces below the tables, the horizontal spacing between the tines of the forks being such as to allow the forks to straddle the tables during vertical downward movement of the arms below the tables in response to said second motive means.

3. A transport according to claim 2 wherein said first motive means is selectively operable and controllable to index said arms either between adjacent tables or to skip every other table.

4. A transporter according to claim 1 wherein the first and second registering members comprise mating male and female members.

5. A transporter according to claim 4 wherein the male registering members comprise round rods on perpendicular x-y axes at least one of which axes is parallel to a radial line extending horizontally from the vertical carousel axis, and the female registering means comprises V-grooved members engageable with said rods.

6. A transporter according to claim 5 wherein said rods are supported by the tables and the V-grooves are inverted.

7. A transporter according to claim 1 wherein pallets are manually-loaded onto the forks at an infeed table of said carousel and manually or automatically unloaded from the forks at an outfeed station of the carousel.

8. A transporter according to claim 1 wherein said second motive means is capable of multiple speeds, and wherein at least one of the lifting or lowering motions is accomplished at a creep speed.

9. A method of successively transporting unassembled workpieces mounted in unconnected, fixed relation to each other for performing programmed fabrication tasks at successive work stations to interconnect the workpieces into fabricated structures, comprising the steps of:

a) positioning sets of a plurality of unassembled workpieces onto at least one pallet and clamping them relative thereto, b) indexing the pallets in step fashion in a first, upper horizontal plane and in an arcuate path from an infeed station toward an outfeed station, with the indexing being angularly defined by angular horizontal spacing between the work stations, c) lowering the pallets at the end of each indexing step to place the pallets on tables at each work station, d) registering each pallet to each table at each work station, e) performing fabrication tasks on the workpieces in each station by means of work-performing equipment programmed and positioned precisely in relation to workpieces clamped to the pallets, and, f) lifting the pallets from the tables and transporting them to the next adjacent tables upon completion of the tasks at each work station.

10. A method according to claim 9 wherein the work is performed by welding.

11. A method according to claim 9 wherein the indexing steps include forwarding, lowering, lifting and again forwarding pallets between two adjacent stations.

12. A method according to claim 9 wherein transporting means is provided to perform said indexing steps, and wherein said transporting means operates through the steps of:

a) lifting a first pallet containing interconnected workpieces at one work station, b). forwarding the first pallet to a location over and above the next work station, c) lowering the first pallet to said next work station to locate and register it with registering means thereat, d) continuing lowering of the transporting means to a level below the work table after the first pallet is deposited on thereon, and, e) returning the transporting means in a second, lower horizontal plane whereby, upon completion of fabrication tasks at said next work station, the transporting means can lift said first pallet for transport to a next-following station while simultaneously lifting a second pallet from said one work station and proceeding to index it forwardly in said first plane for location and registration at said next work station.

13. A method according to claim 9 wherein the lowering of said first pallet to locate and register it on the registering means is accomplished at a creep speed.

14. A method according to claim 9 wherein the lifting of both said first and second pallets is accomplished at a creep speed.

15. A method according to claim 14 wherein all of said pallets are lifted and lowered simultaneously.

* * * * *